(12) United States Patent
Kawahara et al.

(10) Patent No.: US 8,128,836 B2
(45) Date of Patent: Mar. 6, 2012

(54) ELECTROLYTE MEMBRANE AND METHOD OF SELECTING THE SAME

(75) Inventors: Mitsuyasu Kawahara, Susono (JP); Masayoshi Takami, Hamamatsu (JP); Katsuhiko Iwasaki, Tsukuba (JP); Shin Saito, Tsukuba (JP)

(73) Assignees: Toyota Jidosha Kabushiki Kaisha, Toyota (JP); Sumitomo Chemical Company, Limited, Tokyo (JP)

( * ) Notice: Subject to any disclaimer, the term of this patent is extended or adjusted under 35 U.S.C. 154(b) by 559 days.

(21) Appl. No.: 12/308,174

(22) PCT Filed: Jun. 11, 2007

(86) PCT No.: PCT/JP2007/061749
§ 371 (c)(1),
(2), (4) Date: Feb. 3, 2009

(87) PCT Pub. No.: WO2007/145176
PCT Pub. Date: Dec. 21, 2007

(65) Prior Publication Data
US 2009/0166579 A1  Jul. 2, 2009

(30) Foreign Application Priority Data

Jun. 12, 2006 (JP) ................. 2006-162313

(51) Int. Cl.
H01M 4/88 (2006.01)
H01M 6/00 (2006.01)
H01M 6/04 (2006.01)
(52) U.S. Cl. .............. 252/182.1; 429/122; 429/188
(58) Field of Classification Search ............. 429/122, 429/188; 252/182.1
See application file for complete search history.

(56) References Cited

U.S. PATENT DOCUMENTS
2003/0166824 A1  9/2003  Sasaki et al.

FOREIGN PATENT DOCUMENTS
| JP | A-2001-262471 | 9/2001 |
| JP | A-2002-38361 | 2/2002 |
| JP | A-2004-244517 | 9/2004 |
| JP | A-2005-166329 | 6/2005 |
| JP | A-2007-39554 | 2/2007 |
| WO | WO 2005/097866 A1 | 10/2005 |

OTHER PUBLICATIONS

Geormezi et al. (CI&EQ vol. 1 No. 3 pp. 137-142 2005) Bhushan et al. (Journal of Applied Polymer Science vol. 83 No. 10 pp. 2225-2244).*
Bhushan et al. (Journal of Applied Polymer Science vol. 83 No. 10 pp. 2225-2244).*
Zhang et al. (Journal of the Electrochemical Society vol. 153 No. 6 pp. A1062-A1072 [Apr. 2006]).*
Williams et al J American Chemical Society vol. 77 No. 14 Jul. 20 1955 pp. 3701-3707.*

* cited by examiner

*Primary Examiner* — Patrick Ryan
*Assistant Examiner* — Aaron Greso
(74) *Attorney, Agent, or Firm* — Oliff & Berridge, PLC

(57) ABSTRACT

The present invention is to provide an electrolyte membrane which retains durability even after having undergone a dimensional change accompanying chemical deterioration caused owing to radicals having high oxidizing ability such as hydroxyl radicals (.OH) or peroxide radicals (.OOH), and the selecting method thereof.
An electrolyte membrane has an amount of dimensional change in a plane direction between dimensions obtained in a dry state before and after carrying out the Fenton test, the amount of dimensional change before and after the Fenton test being smaller than an amount of maximum elastic deformation in a plane direction obtained in dry state before carrying out the Fenton test, provided that the Fenton test is carried out under the following condition, and the selecting method of the same.
<Condition of Fenton test> (1) iron ion ($Fe^{2+}$) concentration: 4 ppm, (2) hydrogen peroxide concentration: 3 wt %, (3) boiling temperature: 80° C., (4) boiling time: 120 minutes.

5 Claims, 6 Drawing Sheets

ELECTROLYTE MEMBRANE AND METHOD OF SELECTING THE SAME

TECHNICAL FIELD

The present invention relates to an electrolyte membrane and a method of selecting the same.

BACKGROUND ART

A fuel cell converts chemical energy directly into electrical energy by providing a fuel and an oxidant for two electrically-connected electrodes, and causing electrochemical oxidation of fuel. Unlike thermal power, the fuel cell shows high energy conversion efficiency since it is not subject to the restriction of Carnot cycle. The fuel cell generally has a structure provided with plurality of stacked single cells, each having a fundamental structure of the membrane-electrode assembly in which the electrolyte membrane is interposed between a pair of electrodes. In particular, a solid polymer electrolyte fuel cell using the solid polymer electrolyte membrane as the electrolyte membrane has advantages in easiness to downsize and workability at low temperature or the like, and attention is hence attracted particularly to an employment of the solid polymer electrolyte fuel cell as portable and mobile power supply.

In the solid polymer electrolyte fuel cell, a reaction of formula (1) proceeds at an anode (fuel electrode).

$$H_2 \rightarrow 2H^+ + 2e^- \quad (1)$$

Electrons generated in the formula (1) reach a cathode (oxidant electrode) after passing through an external circuit and working at an outside load. Then, protons generated in the formula (1) in a state of hydration with water move the inside of the solid polymer electrolyte membrane from its anode side to its cathode side by electro-osmosis.

On the other hand, a reaction of formula (2) proceeds at the cathode.

$$4H^+ + O_2 + 4e^- \rightarrow 2H_2O \quad (2)$$

As mentioned above, since some water molecule accompany protons generated at the anode when the protons transfer to the cathode through the solid polymer electrolyte membrane, the solid polymer electrolyte membrane needs to retain high wet state. Thus, a membrane-electrode assembly may be humidified by providing moisture to reaction gas (fuel gas, oxidant gas).

The wet state of the solid polymer electrolyte membrane in the fuel cell varies by operating status and operating condition of the fuel cell or the like. For example, the wet state of the electrolyte membrane varies by operation status of the fuel cell which is in operation or not. And also it varies by current density, cell temperature and humidified temperature of the reaction gas or the like under the operation environment the fuel cell.

With a variation in the wet state (wet, dry), the electrolyte membrane expands (when wet) and contracts (when dry). The electrolyte membrane which has once expanded or contracted may not return to the original flat condition and crinkle may be formed. Parts of crinkle formed on the electrolyte membrane which is fixed in the membrane-electrode assembly are easily collect water, thereby break of the electrolyte membrane and peeling between the electrolyte membrane and a catalyst layer which is adjacent to the electrolyte membrane or the like are caused. Further, cracks are generated by concentrating deformational stress on the crinkle by repeated expansion and contraction, and then the electrolyte membrane may be eventually broken.

As mentioned above, the crinkle of the electrolyte membrane generated by dimensional change causes a deterioration of the electrolyte membrane and a decline in electric performance of the fuel cell. In addition, the electrolyte membrane on which cracks and breaks are generated causes so-called cross leak which is that the reaction gas passes in a molecular state without ionizing and causes further deterioration of the membrane and other constructional element of the fuel cell.

In order to solve the above problems, various arts are proposed. For example, Patent Document 1 discloses a method of producing an electrolyte membrane having small dimensional change to plane direction in a heating and moisture state of the electrolyte membrane for solid polymer fuel cell and an electrolyte membrane obtained by the method. According to Patent Document 1, it says that it is possible to obtain the electrolyte membrane for the solid polymer fuel cell whose contraction percentage at 160° C. is within a range of 1 to 35%, and whose percentage of dimensional change at 80° C. in wet condition is within a range of −10 to 30% in proportion to the contracting percentage at 23° C. in 50% of the humidity by the method disclosed in the Patent Document 1.

Patent Document 1: Japanese Patent Application Laid-open No. 2005-166329

DISCLOSURE OF INVENTION

However, the amount of dimensional change accompanying the change of the wet state of the electrolyte membrane depends on a solid polymer electrolyte resin to be used. Even when the amount of dimensional change (percentage of dimensional change) is same, the extent of membrane damage varies according to the kind of the solid polymer electrolyte resin. By contrast, Patent Document 1 uniformly defines that "percentage of dimensional change at 80° C. in wet condition is within a range of −10 to 30% in proportion to contracting percentage at 23° C. in 50% of humidity" regardless of the kind of the solid polymer electrolyte resin to be used, therefore it seems difficult to prevent sufficiently the damage of the membrane causes by the dimensional change accompanying the change of the wet state and the decline in performance of the fuel cell.

In the solid polymer electrolyte fuel cell, a side reaction is caused besides a main reaction in the formula (1) and formula (2), and hydrogen peroxide is produced. The produced hydrogen peroxide generates radicals having high oxidizing ability such as hydroxyl radicals (.OH) or peroxide radicals (.OOH). When these radicals move to the solid polymer electrolyte membrane, hydrogen and fluorine or the like is extracted from the electrolyte resin of the solid polymer electrolyte membrane and macromolecular chain is broken, thus the chemical deterioration of the solid polymer electrolyte membrane is caused. Such radical attacks are one of main causes of the chemical deterioration of the electrolyte membrane.

As the result of the above-mentioned chemical deterioration progressing, the solid polymer electrolyte membrane contracts from the initial (when not in use) dimension in company with decrease of density. The dimension change in company with the chemical deterioration is also one of major causes of further deterioration of the electrolyte membrane and the decline in electric performance of the fuel cell as well as the dimension change accompanying the change of wet state of the electrolyte membrane. However, in the art disclosed in Patent Document 1, the dimension change by the chemical deterioration is totally unconsidered.

In addition, the durability of the electrolyte membrane for fuel cell is generally able to be evaluated by endurance time and rate of voltage reduction when the fuel cell operates using the membrane as the electrolyte. However, in order to evaluate the durability at practical level, it is required 1,000 hours or more, which means that it is required much time to select the membrane having an excellent durability.

The present invention has been achieved in view of the above circumstances, and it is an object of the present invention to provide an electrolyte membrane which retains durability even after having undergone a dimensional change accompanying chemical deterioration caused owing to radicals having high oxidizing ability such as hydroxyl radicals (.OH) or peroxide radicals (.OOH), and the selecting method thereof.

Means for Solving the Problem

The electrolyte membrane according to the present invention has an amount of dimensional change in a plane direction between dimensions obtained in a dry state before and after carrying out the Fenton test, the amount of dimensional change before and after the Fenton test being smaller than an amount of maximum elastic deformation in a plane direction obtained in a dry state before carrying out the Fenton test, provided that the Fenton test is carried out under the following condition.

<Condition of Fenton Test>
(1) iron ion ($Fe^{2+}$) concentration: 4 ppm
(2) hydrogen peroxide concentration: 3 wt %
(3) boiling temperature: 80° C.
(4) boiling time: 120 minutes The electrolyte membrane contracts by decrease of density and causes the decline of mechanical strength in company with the chemical deterioration. When an electrolyte membrane which is incorporated into the fuel cell and fixed therein contracts under such a state of declined mechanical strength, stress is produced on the electrolyte membrane and mechanical fatigue is caused. The electrolyte membrane of the present invention having smaller amount of contraction (the amount of dimensional change) accompanying the chemical deterioration than the amount of maximum elastic deformation in the plane direction obtained in the dry state before the chemical deterioration is hard to cause the mechanical fatigue and is excellent in the durability compared to the electrolyte membrane having larger amount of contraction accompanying the chemical deterioration than the amount of maximum elastic deformation in the plane direction obtained in the dry state before the chemical deterioration.

Further, in the electrolyte membrane after the Fenton test, the electrolyte membrane has an amount of dimensional change in a plane direction obtained by transferring the electrolyte membrane after carrying out the Fenton test between the dry state and the wet state, the amount of dimensional change between the dry state and the wet state is preferably smaller than an amount of maximum elastic deformation in a plane direction obtained in the dry state before carrying out the Fenton test. Such the electrolyte membrane is less likely to cause cracks and breaks through the frequent repetition of expansion and contraction even if it goes into the state of the chemical deterioration and the decline of the mechanical strength, and is accordingly excellent in the durability.

In the electrolyte membrane, it is preferable that the amount of maximum elastic deformation in the plane direction obtained in the dry state before carrying out the Fenton test is 7% or more. Such the electrolyte membrane is more excellent in the mechanical strength, so that it has an advantage of preventing inconvenience that the electrolyte membrane is broken when the fuel cell is assembled.

In addition, the electrolyte membrane preferably comprises hydrocarbon polymer electrolyte resin. The electrolyte membrane has such an advantage as that an electrolyte membrane can be produced at relatively low cost. Further, the electrolyte membrane is favorable in the view of easy disposal, which means excellent in easiness when aging polymer electrolyte membrane is discarded.

Further, for the electrolyte membrane, the present invention provides a method of selecting an electrolyte membrane comprising the steps of: measuring an amount of maximum elastic deformation in a plane direction obtained in a dry state before carrying out the Fenton test in the above-mentioned condition; carrying but the Fenton test for the electrolyte membrane; and measuring an amount of dimensional change in a plane direction between dimensions obtained in a dry state before and after carrying out the Fenton test; wherein the electrolyte membrane is determined as a good product provided that the amount of dimensional change in a plane direction between dimensions obtained in the dry state before and after carrying out the Fenton test is smaller than the amount of maximum elastic deformation in a plane direction obtained in the dry state before carrying out the Fenton test.

Effect of the Invention

The electrolyte membrane of the present invention retains the durability even after causing the dimension change (contraction) accompanying the chemical deterioration caused owing to radicals such as hydroxyl radicals (.OH) or peroxide radicals (.OOH). Therefore, by the use of the electrolyte membrane of the present invention, the fuel cell showing the stable electric performance over a long time can be obtained.

The selecting method of the present invention enables efficient and brief selecting of the electrolyte membrane possessing high degree of durability, in a durability evaluation of the electrolyte membrane for the fuel cell which requires relatively long time, so that it is highly useful in industrial use.

BRIEF DESCRIPTION OF DRAWINGS

In the accompanying drawings.

Figure 1:
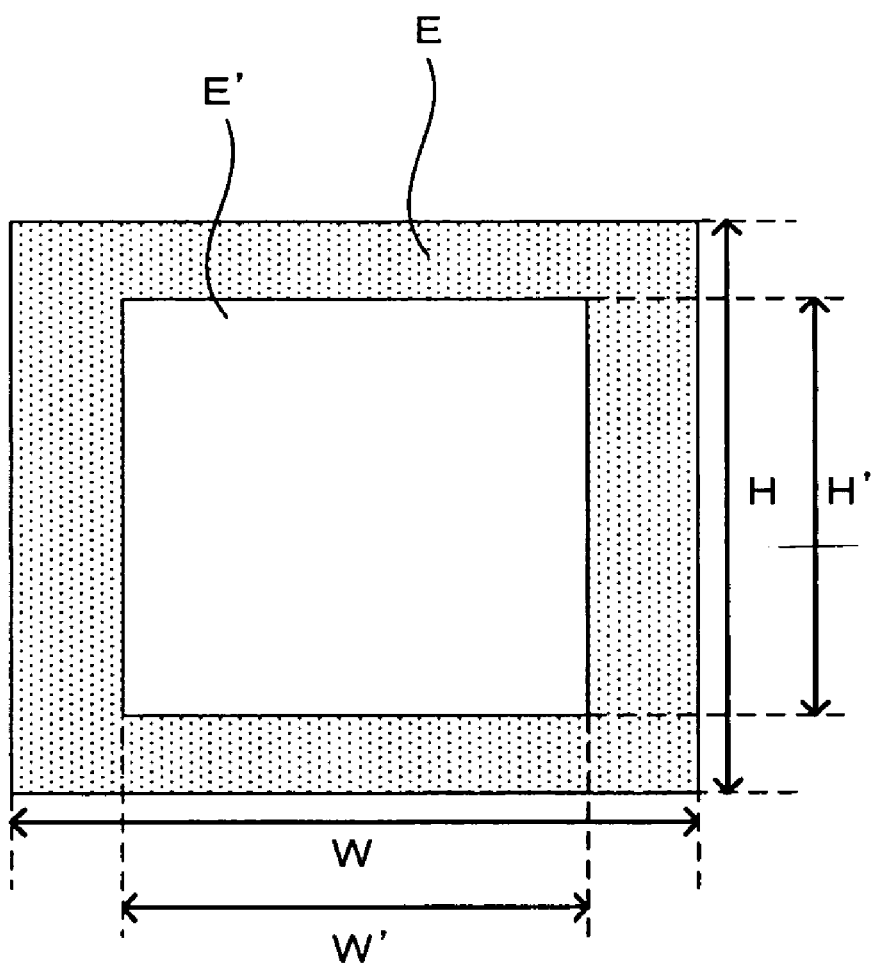
FIG. 1 is a diagram showing an amount of dimensional change in a plane direction of the electrolyte membrane.

The numerical symbol in each figure refers to the following: 1. polymer electrolyte membrane; 2a. catalyst layer; 2b. gas diffusion layer; 2. electrode; 3a. catalyst layer; 3b. gas diffusion layer; 3. electrode; 4. membrane-electrode assembly; 5. separator; 6. gas passage; 100. single cell

BEST MODE FOR CARRYING OUT THE INVENTION

The electrolyte membrane according to the present invention has an amount of dimensional change (amount of contraction) in a plane direction between dimensions obtained in a dry state before and after carrying out the Fenton test, the amount of dimensional change before and after the Fenton test being smaller than an amount of maximum elastic deformation in a plane direction obtained in the dry state before carrying out the Fenton test, provided that the Fenton test is carried out under the following condition.
<Condition of Fenton Test>
(1) iron ion ($Fe^{2+}$) concentration: 4 ppm
(2) hydrogen peroxide concentration: 3 wt %
(3) boiling temperature: 80° C.
(4) boiling time: 120 minutes In company with the operation of the fuel cell, the chemical deterioration of the electrolyte membrane progresses. As mentioned above, the attack by radicals such as hydroxyl radicals (.OH) or peroxide radicals (.OOH) generated from the hydrogen peroxide produced in the membrane-electrode assembly is one of main causes of the chemical deterioration of the electrolyte membrane. A chemically-deteriorated electrolyte membrane causes the decrease of the density followed by contracting. Then, the mechanical strength of the chemically-deteriorated electrolyte membrane also declines.

The electrolyte membrane incorporated in the fuel cell is fixed under contact pressure. Under such the condition, when the decline of mechanical strength and contraction which accompanies the chemical deterioration is caused on the electrolyte membrane, stress is produced in the electrolyte membrane and the electrolyte membrane is under mechanical stress. Accordingly, the electrolyte membrane causes mechanical fatigue and the durability declines as a cause of the chemical deterioration and mechanical fatigue.

The inventors found that the electrolyte membrane having smaller amount of contraction in the state that the mechanical strength is declined by the chemical deterioration which progresses under the environment in such the fuel cell than the amount of maximum elastic deformation obtained in the dry state before the chemical deterioration is excellent in the durability compared to the electrolyte membrane having larger amount of contraction than the amount of the maximum elastic deformation.

The Fenton test is carried out as soaking the electrolyte membrane in a solution containing hydrogen peroxide and iron ion ($Fe^{2+}$) and the electrolyte membrane is subjected to radical oxidation and decomposed by hydroxyl radicals (.OH) which is a strong oxidant generated by the Fenton reaction ($H_2O_2+Fe^{2+} \rightarrow Fe^{3+}+OH^-+.OH$).

Hydroxyl radicals generated by the Fenton reaction directly attack, oxidize and decompose the electrolyte membrane, thereby the electrolyte membrane is deteriorated. Further, hydroxyl radicals react with hydrogen peroxide to form peroxide radicals (.OOH). The peroxide radicals also attack the electrolyte membrane, thereby the electrolyte membrane is oxidized, decomposed and deteriorated.

When the electrolyte membrane of the present invention is chemically deteriorated artificially by carrying out the Fenton test under the specified conditions, the dimension change (contraction) in the plane direction before and after the test namely before and after the chemical deterioration, is in a range of the elastic region.

The term "the amount of dimensional change (amount of contraction) in the plane direction between dimensions obtained in a dry state before and after the Fenton test" as used herein means an amount that the dimension of electrolyte membrane in the plane direction in which the electrolyte membrane is in a dry state after the Fenton test (hereinafter, it may be simply referred to as "dimension after Fenton test") is changed, in proportion to the dimension of electrolyte membrane (in state of unused, un-deteriorated) in the plane direction in which the electrolyte membrane is in a dry state before the Fenton test (hereinafter, it may be simply referred to as "dimension before Fenton test"), and it is represented by [(dimension before Fenton test−dimension after Fenton test)/dimension before Fenton test]×100.

The amount of dimensional change in the plane direction of the electrolyte membrane may be varies from the in-plane direction of the electrolyte membrane by oriented direction when forming the electrolyte membrane or the like. Therefore, by measuring the dimensional change in all directions in the plane direction of the electrolyte membrane, a position which has the largest amount of dimensional change obtained from the dimensions before and after the Fenton test is defined, thus the amount of dimensional change at the position is determined as the amount of dimensional change in the plane direction of the electrolyte membrane. Also, the term "the plane direction of the electrolyte membrane" means directions to which the plane of the membrane extends.

For example, in FIG. 1, when a dimension in the plane direction of an electrolyte membrane E (height: H, wide: W) which is in a dry state before the Fenton test and a dimension in the plane direction of an electrolyte membrane E' (height: H', wide: W') which is in a dry state after the Fenton test are compared to each other by aligning measured positions, in case that the amount of dimensional change ((H−H')/H×100%) in height direction is larger than the amount of dimensional change ((W−W')/W×100%) in width direction, the amount of dimensional change in height direction is used as the amount of dimensional change in the plane direction of electrolyte membrane obtained in the dry state before and after the Fenton test.

The term "dry state" means the state that the amount of change in weight of the electrolyte membrane owing to a moisture content becomes 5% or less when the electrolyte membrane is left in an environment with relative humidity of 5% or less. The amount of change in weight of the electrolyte membrane owing to a moisture content generally turns to the stable state by leaving for an hour under the environment of each relative humidity. A temperature condition in the dry state is not specified, however, the relative humidity at 60° C. or more, particularly 80° C. or more, may be defined as the above range, which make the electrolyte membrane to the dry state.

Hereinafter, a measuring method of the amount of dimensional change (amount of contraction) in the plane direction obtained in the dry state before and after the Fenton test will be explained in detail.

Specifically, un-deteriorated (unused) electrolyte membrane is firstly left in an environment with relative humidity of 5% or less for 1 hours or more (for example, under condition with vacuum drying, at 60° C., for 24 hours or more) so as to be into a dry state and the dimension in the plane direction is immediately measured. Then the electrolyte membrane is soaked in a Fenton test solution ((3) 80° C.) with concentrations (1) 4 ppm of iron ion ($Fe^{2+}$) and (2) 3 wt % of hydrogen peroxide for (4) 120 minutes and oxidized (Fenton test).

Subsequently, the electrolyte membrane after the Fenton test is washed with HCl solution (generally, 1N is preferable) followed by removing moisture from the surface. Then the membrane is left in an environment with relative humidity of 5% or less for 1 hour or more (for example, under condition with vacuum drying, at 60° C., for 24 hours or more) to be into a dry state and the dimension in the plane direction is immediately measured.

The amount of dimensional change before and after the Fenton test [{(dimension before Fenton test−dimension after Fenton test)/dimension before Fenton test}×100] is calculated from the dimension before the Fenton test and the dimension after the Fenton test measured by the above.

As a resource of iron ion ($Fe^{2+}$) may be material which generates iron ion in the water. For example, there may be a salt such as $FeCl_2 \cdot 4H_2O$, $FeCl_2$.

The amount of maximum elastic deformation of the electrolyte membrane obtained in the dry state before the Fenton test is calculated by stress-strain (amount of dimensional change) curve obtained by the tensile test. When external force is applied to the electrolyte membrane, the stress corresponding to the external force generated in the membrane and membrane is deformed. This deformation is an elastic deformation as far as the external force is small. The elastic deformation makes it possible to recover (restore) to original shape when the external force is removed. But, when the extent of stress exceeds a certain limit, a plastic deformation, which makes it impossible to completely restore even the external force is removed, is caused. The amount of deformation when the stress limit allowing the restoration (elastic limit) is added to the electrolyte membrane is referred as the amount of maximum elastic deformation.

The tensile test may be carried out according to JIS K-7127 (specimen type 5). Specific testing conditions are that strain rate 10 mm/min, atmosphere temperature 80° C., dry atmosphere (5% RH or less).

In the present invention, the amount of maximum elastic deformation obtained in the dry state before the Fenton test is used as a reference of the amount of dimensional change before and after the Fenton test. Since the wet state membrane is stretchy compared with dry state one, in the case of using the wet state as the reference, it may not be able to judge appropriately the damage of the membrane owing to the dimension change accompanying the chemical deterioration. Therefore, in the present invention, the amount of elastic deformation obtained in the dry state having smaller region of the elastic deformation is used as reference.

As mentioned above, the electrolyte membrane forms the membrane-electrode assembly in the fuel cell and is fixed under contact pressure. When the electrolyte membrane contracts by the chemical deterioration in such the state, the stress is produced on the electrolyte membrane and the electrolyte membrane bears mechanical stress. Accordingly, the electrolyte membrane causes mechanical fatigue. Further, after contracting by the chemical deterioration, the electrolyte membrane alternates between the dry state and the wet state depending on electric generating status and electric generating condition of the fuel cell and repeats the dimension change.

In this case, the electrolyte membrane that the amount of dimensional change in the plane direction obtained in the dry state before and after the Fenton test is not less than the amount of maximum elastic deformation obtained in the dry state in the plane direction before the Fenton test has especially severe damage. Because, in the case that an irreversible contraction by the chemical deterioration causes the dimensional change exceeding the aforementioned amount of maximum elastic deformation, mechanical stress becomes relatively severe and also this severe mechanical stress is continually loaded on the electrolyte membrane in the state that the electrolyte membrane is tied up within the fuel cell. As described above, relatively severe mechanical stress continues to be loaded on the electrolyte membrane in the state that the strengthen is drastically declined, so that the electrolyte membrane goes into a state that cracks, splits and breaks with long-term use is much likely to generate. If cracks and breaks are generated on the electrolyte membrane, the cross leak is easily caused and a proton conductivity also declines. It means that the performance of fuel cell is declined.

By contrast, in the electrolyte membrane of the present invention, the amount of dimensional change in the plane direction obtained in the dry state before and after the Fenton test is smaller than the amount of maximum elastic deformation in the plane direction obtained in the dry state before the Fenton test, so that the mechanical stress is hardly caused by the contraction with the chemical deterioration or if caused, it is relatively little. Thereby, the electrolyte membrane of the present invention is less likely to generate cracks, splits and breaks with the long-term use and excellent in the durability. Therefore, by the use of the electrolyte membrane of the present invention, the fuel cell which is less likely to cause the cross leak, excellent in the electric performance and has excellent durability can be obtained.

Especially, the amount of maximum elastic deformation in the plane direction obtained in the dry state before the Fenton test is preferably 5% or more, and is more preferably 7% or more. If the aforementioned amount of maximum elastic deformation of the electrolyte membrane is 5% or more, a generation of defect such as cracks caused by contact pressure on the plane of the electrolyte membrane can be avoided when the fuel cell is assembled.

The characteristics which the electrolyte membrane of the present invention possesses is used as one of measures in new adoption or development of the electrolyte membrane, thereby it is possible to obtain the electrolyte membrane having excellent durability. Whether the electrolyte membrane has a property of the present invention or not can be evaluated by the above simple method.

In the electrolyte membrane of the present invention, it is preferable that the amount of dimensional change in the plane direction obtained by transferring the electrolyte membrane after the Fenton test between the dry state and the wet state is smaller than an amount of maximum elastic deformation in a plane direction obtained in the dry state before the Fenton test.

Herein, the term "wet state" means the state that the amount of change in weight of the electrolyte membrane owing to a moisture content becomes 5% or less when the electrolyte membrane is left in an environment with relative humidity of 95% or more. The wet electrolyte membrane becomes a swollen state by absorbing large amount of water compare to the dry state. As mentioned above, the amount of change in weight of the electrolyte membrane owing to a moisture content generally turns to the stable state by leaving for an hour under the environment of arbitrary relative humidity. A temperature condition in the wet state is not defined, however, the relative humidity at 60° C. or more, particularly 80° C. or more, may be defined as the above range, which make the electrolyte membrane to the wet state. Specifically, for example, the electrolyte membrane can be into the wet state by boiling it for an hour in hot water at 80° C.

In addition, the term "an amount of dimensional change in a plane direction obtained by transferring the electrolyte membrane after carrying out the Fenton test between the dry state and a wet state" means the amount of dimensional change in the plane direction obtained by transferring the electrolyte membrane from the dry state to the wet state or transferring the electrolyte membrane from the wet state to the dry state after the Fenton test, and which is represented by [(dimension in dry state−dimension in wet state)/dimension in dry state]×100. It is determined as an amount of dimension change measured at a position that makes said amount largest provided that the dimension in the plane direction of the electrolyte membrane in the dry state is compared to that of the swollen electrolyte membrane in the wet state. The dimension of the wet electrolyte membrane may be measured in the hot water or after taking out of the hot water. When checking whether the amount of weight change becomes stable within 5% or not, the membrane is taken out of the hot water and water on the surface is removed by wiping out, then the weight of the electrolyte membrane is measured.

In addition, the dry state means as mentioned above.

The amount of maximum elastic deformation before the Fenton test is calculated by carrying out the tensile test according to JIS K-7127 (specimen type 5) as previously described for the electrolyte membrane before the Fenton test with the condition like the above. Specific test conditions are that strain rate 10 mm/min, atmosphere temperature 80° C., dry atmosphere (5% RH or less).

After the Fenton test, the electrolyte membrane having smaller amount of dimensional change in the plane direction when transferred between the dry state and wet state than the amount of maximum elastic deformation in the plane direction obtained in the dry state before the Fenton test is less likely to form crinkle by expansion/contraction with the change in moist state. Even if the crinkle is formed, the original shape is restored and the crinkle is easily disappeared. Therefore, it is hard to cause peeling between the electrolyte membrane and a catalyst layer which is adjacent to the electrolyte membrane, which arises from collecting water at the part of crinkle. Since the damage to the electrolyte membrane owing to the repetition of expansion•contraction is little, the cracks and breaks are less likely to generate and the cross leak is less likely to cause. This means that the cracks and breaks are less likely to generate even if the expansion and contraction are frequently repeated.

As the solid polymer electrolyte resin having the above-mentioned property of dimensional change, it is possible to use a resin which is constituted by combination of repeating units used in the conventional electrolyte membrane for the fuel cell. As the conventional solid polymer electrolyte resin, for example, hydrocarbon polymer electrolyte resin which is introduced ion-exchange group such as sulfonic acid group, boronic acid group, phosphonic acid group, phenolic hydroxyl group, carboxylic acid group to hydrocarbon polymer such as polyether sulfone, polyimide, polyether ketone, polyether ether ketone, polyphenylene, polybenzimidazole, polybenzothiazole, and polyethylene, polystyrene besides fluorinated electrolyte resin like perfluorocarbon sulfonic acid type resin which is typified by Nafion (product name, manufactured by DuPont) can be used.

The electrolyte membrane of the present invention can be designed in the following two view point: (A) making the amount of maximum dry-sate elastic deformation in the plane direction grow larger, (B) making the amount of dry-state dimensional change in the plane direction before and after the Fenton test grow smaller.

As a specific method which enlarges the amount of maximum elastic deformation of the electrolyte membrane, there may be: (A1) using polymer compound having main chain structure with high flexibility as solid polymer electrolyte resin; (A2) using polymer with high linearity as solid polymer electrolyte resin, namely a method using solid polymer electrolyte resin having less side chain; (A3) using polymer compound having less polar group as solid polymer electrolyte resin, or the like. Also, as a method which uses additives, there may be (A4) making electrolyte membrane contain plasticizer. As the plasticizer, well-known plasticizer in a polymer field is applicable, for example, there may be phthalic acid alkyl ester, adipic acid alkyl ester, glycol alkyl ester or the like.

On the other hand, as a method which lowers the amount of dimensional change in the plane direction of the electrolyte membrane before and after the Fenton test, there may be: (B1) using polymer compound having rigid main chain structure as solid polymer electrolyte resin; (B2) using polymer compound having perfluorocarbon structure as solid polymer electrolyte resin, or the like. Also, a method which uses additives, there may be (B3) making electrolyte membrane contain antioxidant. As the antioxidant, it includes concept of aromatic polymer phosphonic acids having excellent radical resistance character which is disclosed in Japanese Patent Application Laid-Open (JP-A) No. 2003-282096 and JP-A No. 2003-238678, in addition to so-called well-known antioxidant such as hindered phenol antioxidant, sulfur-containing antioxidant.

The (A1) is a method which uses the solid polymer electrolyte resin comprising a repeating unit which leads to main chain structure with high flexibility. The repeating unit can be selected from the repeating unit having sulfonyl group, carbonyl group, alkylene group, alkylene fluoride group and oxo group as a part which form the main chain structure. As more specific repeating unit, there may be a repeating unit constituting hydrocarbon polymer such as polyether sulfone, polyether ketone, polyether ether ketone, polyethylene, polystyrene.

In contrast, as the polymer compound having rigid main chain structure in the (B1), there may be a polymer compound such as polyimide, polyphenylene, polybenzimidazole and polybenzothiazole.

As above, in the circumstance that opposed main structures are required, the inventors of the present invention found that a part at which density is decreased after the Fenton test is mainly a part (segment) comprising repeating unit having ion-exchange group. Further they found that the following solid polymer electrolyte resin is suitable for the present invention; The solid polymer electrolyte resin in which repeating unit having ion-exchange group and leading to rigid main chain structure is used, in addition repeating unit not having ion-exchange group and leading to highly-flexible main chain structure is used.

From the above viewpoint, as the polymer electrolyte resin which is suitable to the electrolyte membrane of the present invention, there may be the following (C1) or (C2).

(C1) copolymer comprising: a first repeating unit constituting hydrocarbon polymer selected from such as polyether sulfone, polyether ketone, polyether ether ketone, polyethylene and polystyrene, and not having ion-exchange group; and a second repeating unit which constitutes hydrocarbon polymer selected from such as polyphenylene, polybenzimidazole and polybenzothiazole, and unit having ion-exchange group (C2) copolymer comprising: a first repeating unit constituting hydrocarbon polymer selected from such as polyether sulfone, polyether ketone, polyether ether ketone, polyethylene and polystyrene, and not having ion-exchange group; and a second repeating unit having perfluorocarbon structure and ion-exchange group.

In the present invention, "comprising first repeating unit and second repeating unit" does not mean to exclude third repeating unit. If the first repeating unit and the second repeating unit are contained in the present invention as an essential repeating unit, other any repeating units may be contained. Typically, a total of the first repeating unit and the second repeating unit to be contained is preferably 80 mole % or more, particularly 90 mole % or more and further 95 mole % or more, in proportion to a total of all repeating units.

A first repeating unit of (C1) and (C2) is preferable from the view point of the (A3) because it does not have the ion-exchange group, that is polar group and it may be further preferable from the viewpoint of the (A2), if the first repeating unit does not have a side chain. Additionally, in the viewpoint of obtaining high heat resistance, a repeating unit which leads to aromatic hydrocarbon polymer selected from polyether sulfone, polyether ketone and polyether ether ketone is particularly preferable.

Also, (C1) is more preferable among (C1) and (C2) This is because that the solid polymer electrolyte resin having a repeating unit with perfluorocarbon structure is relatively easy to cause plastic deformation, thus there is a tendency that the amount of maximum elastic deformation of the resin is declined. Although it is not exactly known a reason why the plastic deformation is easily caused, it is presumed that the repeating unit having perfluorocarbon structure, especially a segment wherein the several repeating units are continuously bonded is relatively easy to form a crystalline segment.

From such the reason, as the solid polymer electrolyte resin to be applied to the present invention, (C1) is more preferable. And, as mentioned above, (C1) also has an advantage of low cost and easy disposal.

From the comprehensive viewpoints described above, as the solid polymer electrolyte resin to be applied to the electrolyte membrane of the present invention, the following copolymer is particularly preferable. A copolymer comprising: a first repeating unit leading to aromatic hydrocarbon polymer selected from polyether sulfone, polyether ketone and polyether ether ketone, and not having an ion-exchange group; a second repeating unit constituting hydrocarbon polymer selected from polyphenylene, polybenzimidazole and polybenzothiazole, and having an ion-exchange group.

Since the electrolyte membrane formed of such preferred copolymer has a structure that the first repeating unit and the second repeating unit cause phase separation on the molecular level or cause microphase separation in the membrane, by selecting plasticizer concerning the (A4) and/or antioxidant concerning (B3), the aforementioned amount of maximum elastic deformation and the aforementioned amount of dimensional change can be efficiently optimized. Therefore, the plasticizer may be selected one having affinity to the first repeating unit, and the antioxidant may be selected one having affinity to the second repeating unit. Among the above-illustrated plasticizer, the alkyl ester having long-chain alkyl ester such as 2-ethylhexyl ester is suitable from the viewpoint of hydrophobicity. As the antioxidant, the aforementioned aromatic phosphonic acids is suitable as the affinity of the antioxidant can be good by forming hydrogen bonding with ion-exchange group in the second repeating unit or the like.

As the solid polymer electrolyte resin used in the electrolyte membrane of the present invention, the hydrocarbon polymer electrolyte resin is preferable from the viewpoint of low cost and easy disposal. Herein, the hydrocarbon polymer electrolyte resin means the polymer electrolyte having 15 weight % or less of total of halogen atoms (fluorine atom, chlorine atom, bromine atom and iodine atom), provided that the total of halogen atoms is expressed as a weight ratio based on a weight containing elements present when all ion-exchange groups are in the free acid form. The hydrocarbon polymer electrolyte resin certainly contains carbon atom and hydrogen atom, as for the rest, nitrogen atom, oxygen atom, sulfur atom, phosphorus atom, silicon atom, boron atom may be contained.

Such the hydrocarbon polymer electrolyte has an advantage in that the above-mentioned preferred polymer electrolyte polymer electrolyte (C1) has various kinds of repeating unit as the first repeating unit and the second repeating unit from which one having the first repeating unit and the second repeating unit can be selected, and a solid polymer electrolyte resin which can be suitably applied to the present invention can be easily obtained by using a selecting method of the present invention which will hereinafter be described. Although the hydrocarbon polymer electrolyte may contain fluorinated alkylene group as a part concerning high flexuous main chain structure as mentioned above, in that case, it is necessary that fluorine atom-containing weight ratio does not exceed the range of the halogen atom-containing weight ratio aforementioned.

The electrolyte membrane of the present invention can be produced in the following manner: the above solid polymer electrolyte resin is dissolved or dispersed in a solvent that accordingly combines alcohols such as methanol, ethanol, propanol and water or the like, or polar organic solvent such as dimethylsulfoxide and dimethylformamide to produce electrolyte solution. Then obtained solution is subjected to flow casting on the surface of substrate or the like and mold, and dried. Also, it can be produced by extrusion molding method of the polymer electrolyte at the temperature more than the glass transition temperature. A method of producing the electrolyte membrane of the present invention is not limited to them. In addition, the electrolyte membrane of the present invention can be laminated with an electrolyte membrane made of other solid polymer electrolyte resin and used.

In another aspect, the present invention provides a method of selecting an electrolyte membrane comprising the steps of: for the electrolyte membrane obtained by such the manner, measuring the amount of the maximum elastic deformation in the plane direction obtained in the dry state as measured before the Fenton test; carrying out the Fenton test for the electrolyte membrane; and measuring the amount of dimensional change in the plane direction between dimensions obtained in the dry state before and after carrying out the Fenton test; wherein the electrolyte membrane is determined as a good product provided that the amount of dimensional change in a plane direction between dimensions obtained in the dry state before and after carrying out the Fenton test is smaller than the amount of maximum elastic deformation in a plane direction obtained in the dry state before carrying out the Fenton test. Means of measurement of the amount of maximum elastic deformation obtained in the dry state before the Fenton test and the amount of dimensional change in the dry state before and after the Fenton test are as mentioned above.

Particularly, it is preferable to select the first repeating unit and the second repeating unit in the solid polymer electrolyte resin illustrated in the (C1), and to produce the copolymer by known method. Then, by selecting the electrolyte resin by the selecting method, it is possible to obtain easily the electrolyte membrane suitable for the fuel cell.

Figure 6:
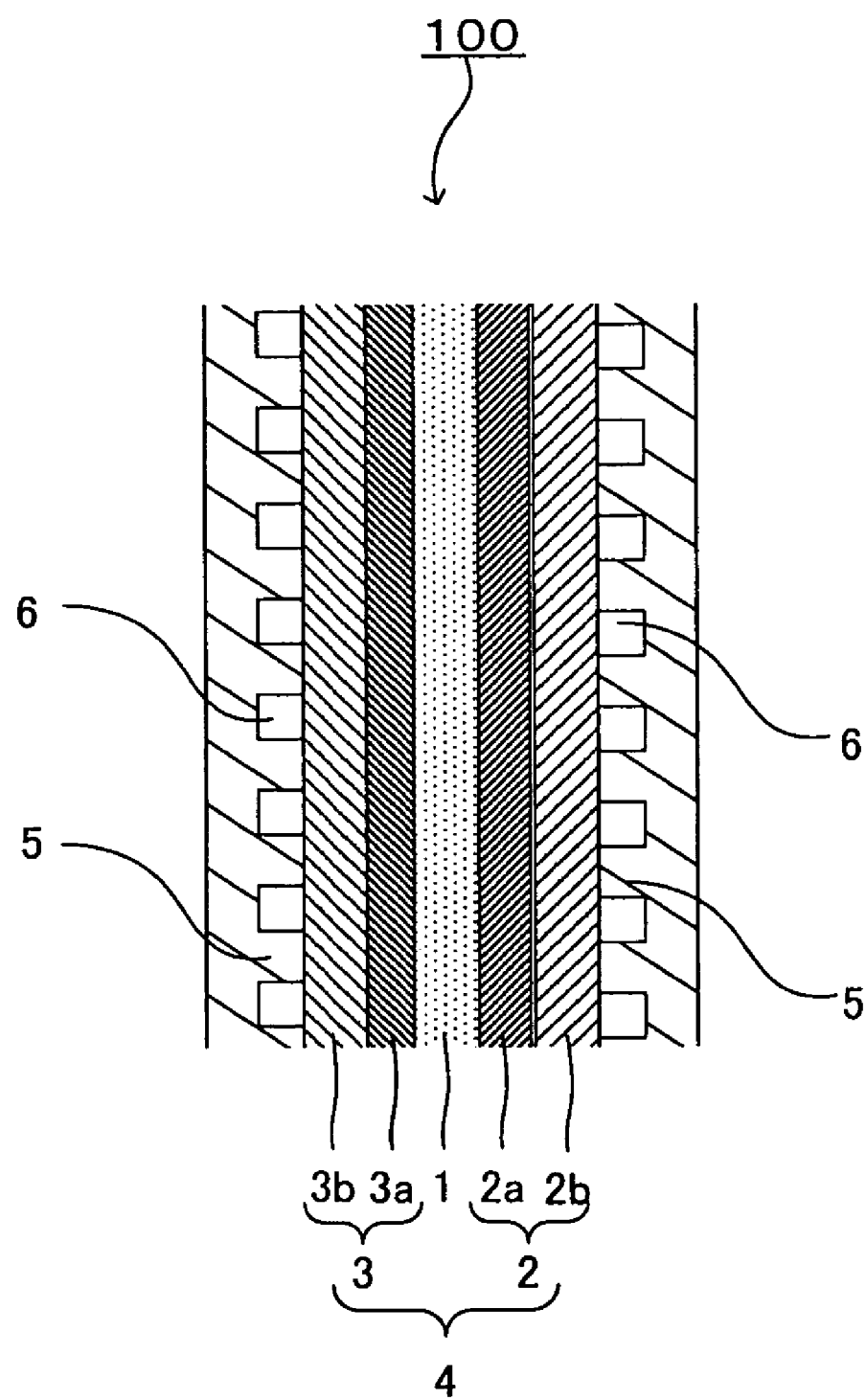
FIG. 6 is a sectional view illustrating an embodiment of a fuel cell provided with an electrolyte membrane of the present invention.

The electrolyte membrane of the present invention is typically used as the electrolyte membrane for the fuel cell and can be utilized in other fields. In the case of using as the electrolyte membrane for the fuel cell, it is used in a similar manner to that of a general solid polymer electrolyte membrane. As showing in FIG. 6, electrode 2, 3 respectively made of catalyst layer 2a, 3a and gas diffusion layer 2b, 3b are provided on both surfaces of the unilaminated or multilayered electrolyte membrane 1 having the electrolyte membrane of the present invention, thus the membrane-electrode assembly 4 can be formed. The membrane-electrode assembly 4 is further assembled with separators 5,5 which generally functions as a collector and defines fuel passage or oxidant passage 6,6 by being disposed on the outside the membrane-electrode assembly. Thus, a cell 100 for the fuel cell is produced, and constitutes the fuel cell.

The fuel cell obtained by the above can use gaseous fuel such as hydrogen gas and gas which generates hydrogen, and aqueous fuel including alcohol solution such as methanol solution as the fuel. And, gaseous oxidant containing oxygen such as air can be used as oxidant.

EXAMPLES

Synthesis Example 1

Production of Polymer Electrolyte A 2,5-dichlorobenzenesulfonic acid sodium salt and polyether sulfone (product name: SUMICAEXCEL PES 5200P, manufactured by Sumitomo Chemical) which is chloro-terminal type were reacted with the use of bis(1,5-cyclooctadiene)nickel (0) in the presence of 2,2'-bipyridyl, then polyarylene block copolymer (polymer electrolyte A) represented in the following Formula (3) was obtained.

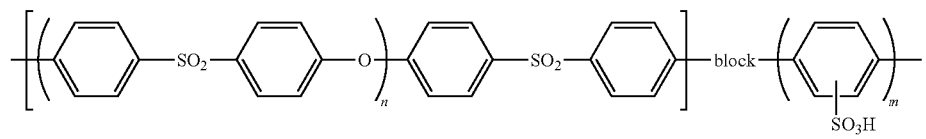

Formula (3)

Obtained polymer electrolyte A was soaked in 0.1 N sodium hydroxide aqueous solution for 2 hours followed by titrating the remaining sodium hydroxide solution with 0.1 N hydrochloric acid aqueous solution to measure ion-exchange capacity of the polymer electrolyte A. The ion-exchange capacity of the polymer electrolyte A was 1.8 meq/g.

Synthesis Example 2

Production of Polymer Electrolyte B 4,4'-difluorodiphenyl sulfone-3,31-disulfonic acid dipotassium salt and 2,5-dihydroxybenzenesulfonic acid potassium salt were reacted in dimethylsulfoxide (DMSO) in the presence of potassium carbonate to obtain hydrophilic oligomer solution. On the other hand, 4,4'-difluoro diphenyl sulfone and 2,6-dihydroxynaphthalene were reacted in mixed solvent with DMSO and N-methyl-2-pyrolidone (NMP) in the presence of potassium carbonate to obtain hydrophobic oligomer solution. Obtained hydrophilic oligomer solution and hydrophobic oligomer solution were mixed to react, thereby a block copolymer (polymer electrolyte B) represented in the following Formula (4) was obtained.

Formula (4)

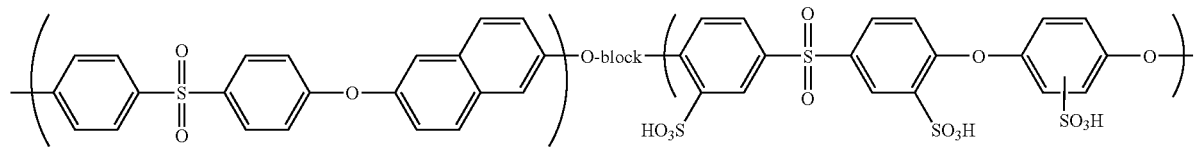

The ion-exchange capacity of obtained polymer electrolyte B was measured in the same manner as the polymer electrolyte A, the result was 1.9 meq/g.

Synthesis Example 3

Production of Polymer Compound P

With reference to a method which is disclosed in JP-A No. H10-28209, in the presence of diphenylsulfone as solvent and potassium carbonate, 4,4'-dihydroxydiphenyl sulfone, 4,4'-dihydroxybiphenyl and 4,4'-dichlorodiphenyl sulfone were reacted with molar ratio of 7:3:10, whereby random copolymer represented in the following Formula (5) was synthesized.

Formula (5)

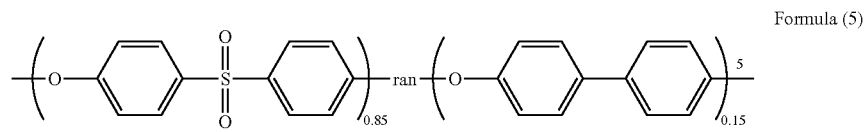

Subsequently, with the reference to a method which is disclosed in JP-A. No. 2003-282096, the random copolymer in Formula (5) was subjected to bromination, phosphonic acid esterification, and hydrolysis, whereby a polymer containing phosphonate group (polymer compound P) represented in the following Formula (6) was obtained. In polymer P, about 0.05 molecule of Br and 1.7 molecule of phosphonate group are substituted with respect to an unit derived from 4,4'-Biphenol.

Formula (6)

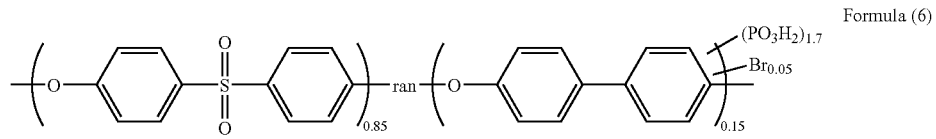

Example 1

<Producing Electrolyte Membrane>

The polymer electrolyte A obtained by the above Synthesis example 1 was dissolved in DMSO to prepare a solution with a concentration of 13.5 weight % of the polymer electrolyte A. Further, the polymer compound P obtained by Synthesis example 3 was added in the solution so that a ratio of polymer compound P to the polymer electrolyte A is 11 weight % and dissolved, thus coating solution was prepared. Obtained coating solution was coated on polyethylene terephthalate (PET) film by die casting method. The membrane obtained by drying the solvent was further subjected to acid treatment with 2N hydrochloric acid and washed with water followed by drying. Thereby, the polymer electrolyte membrane A with the thickness of 30 μm was obtained.

<Measurement of Amount of Maximum Elastic Deformation of Electrolyte Membrane>

A polymer electrolyte membrane A which was cut into 13 cm×5 cm size was prepared.

Obtained polymer electrolyte membrane A was left in a furnace under vacuum drying condition 5% RH or less at 60° C. for 24 hours and dried. Next, the polymer electrolyte membrane A was taken from the furnace and the tensile test [strain rate 10 mm/min, atmosphere temperature 80° C., dry atmosphere (5% RH or less)] was carried out in a $N_2$ purged dry box according to JIS K-7127 (specimen type 5).

The amount of maximum elastic deformation obtained in the dry state of the polymer electrolyte membrane A before the Fenton test was 8%.

<Dimension Measurement of Plane Direction in Dry State before Fenton Test>

A polymer electrolyte membrane A which was cut into 5 cm×5 cm size was left in the furnace under vacuum drying condition at 60° C. (5% RH or less) for 24 hours and dried, and dimensions in each direction of the plane direction were immediately measured.

<Dimension Measurement of Plane Direction in Dry State and Wet State after Fenton Test>

A polymer electrolyte membrane A which was cut into 5 cm×5 cm size was soaked in solution (80° C.) with a concentration of 3 wt % $H_2O_2$ and 4 ppm Fe for 2 hours in an autoclave, thus the Fenton test was carried out. After the Fenton test, the polymer electrolyte membrane A was taken and washed with 1N hydrochloric acid, and further washed with ultra pure water followed by vacuum drying at 60° C. for 24 hours. Subsequently, alternating boiling for 1 hour in a hot water at 80° C. ("in water at 80° C.") and vacuum drying for 24 hours at 60° C. ("V.D.") was repeated for 5 times so that the wet state and the dry state were alternated for 5 times. A percentage of dimensional change in each wet state and dry state [based on dimension in plane direction obtained in the dry state before the Fenton test (*1 in FIG. 2)] is shown in FIG. 2 ("after Fenton test" in FIG. 2).

Figure 2:
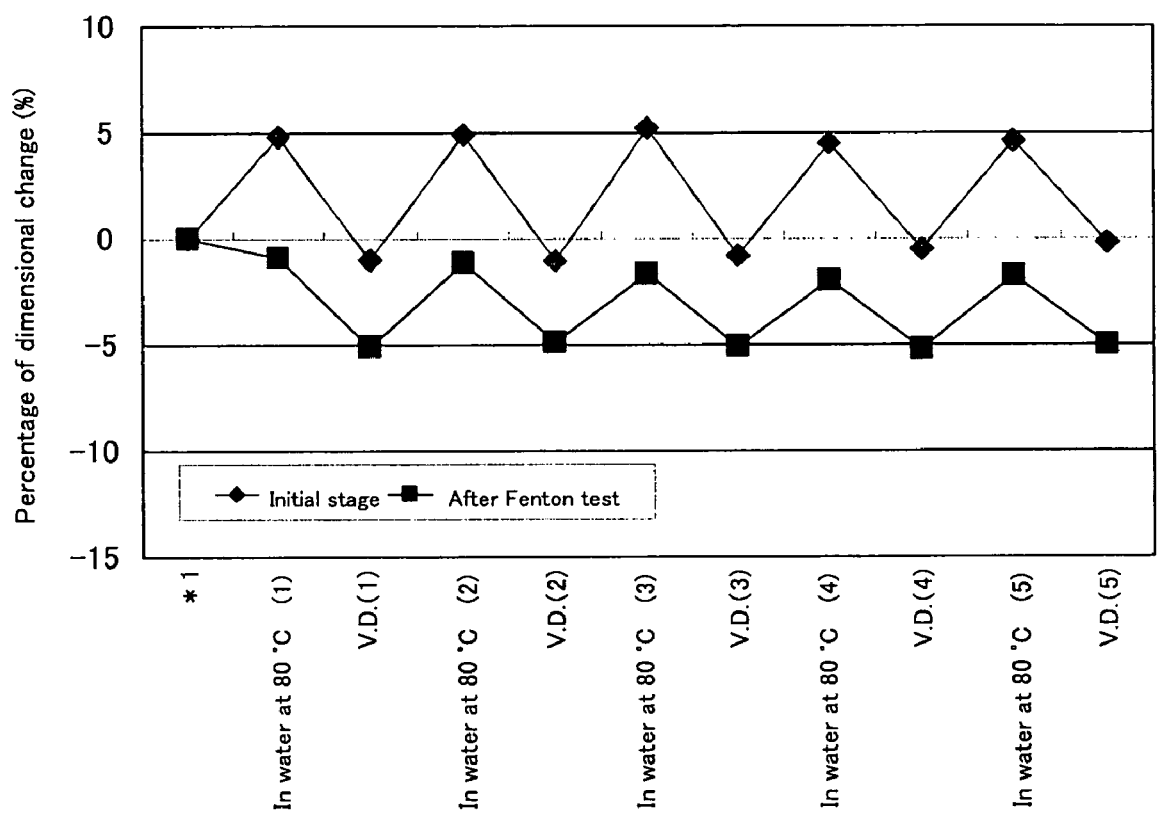
FIG. 2 is a diagram illustrating a percentage of dimensional change (initial·after Fenton test) of an electrolyte membrane A in Examples.

As shown in FIG. 2, the amount of dimensional change of the polymer electrolyte membrane A in the plane direction obtained in the dry state before and after the Fenton test was about 5%, it was smaller than the amount of maximum elastic deformation (8%) obtained in the dry state before the Fenton test. In addition, in the deteriorated state after the Fenton test, the percentage of dimensional change in the plane direction which was caused when transferring between the dry state and the wet state was about 4%, it was smaller than the amount of maximum elastic deformation (8%) obtained in the dry state before the Fenton test.

In FIG. 2, for the polymer electrolyte membrane A before the Fenton test, a percentage of dimensional change in each wet state and dry state when alternating boiling for 1 hour in a hot water at 80° C. ("in water at 80° C.") and vacuum drying for 24 hours at 60° C. ("V.D.") was repeated for 5 times so that the wet state and the dry state were alternated for 5 times, is shown in FIG. 2 ("initial stage" in FIG. 2). FIG. 2 shows that polymer electrolyte membrane A in un-deteriorated state before the Fenton test greatly swelled in the wet state compare to the one in the dry state. On the other hand, the polymer electrolyte membrane A after the Fenton test contracted even in the wet state compared to dry state (contracted state) before the Fenton test (un-deteriorated). This means the polymer electrolyte membrane A greatly contracted by the chemical deterioration.

<Fuel Cell Operating Test of Electrolyte Membrane>

(Production of Catalyst Ink)

Firstly, a catalyst ink which was required to produce a membrane-electrode assembly was prepared. More specifically, 1.00 g of platinum-carried carbon which carries 50 weight % of platinum was added to the 6 mL of commercially available 5 weight % Nafion solution (solvent: mixture with water and lower alcohol) followed by adding 13.2 mL of ethanol. A mixture obtained above was subjected to ultrasonic treatment for an hour followed by agitating by stirrer for 5 hours, whereby the catalyst ink was obtained.

(Production of Membrane-electrode Assembly)

Next, the above catalyst ink was coated by the spray method on an area 5.2 cm square in the center of one side of the polymer electrolyte membrane obtained by the above-mentioned production method. In this case, a distance of discharge hole to the membrane was set to 6 cm and stage temperature was set at 75° C. After for 8 times recoating in the same manner, the coated membrane was left on the stage for 15 minutes to remove the solvent, thus the anode catalyst layer was formed. Obtained anode catalyst layer contains 0.6 $mg/cm^2$ of platinum which was calculated by the composition and coating weight. Subsequently, the catalyst ink was coated on a surface of the electrolyte membrane opposed to in the same manner as above and a cathode catalyst layer containing 0.6 $mg/cm^2$ of platinum was formed. Whereby, the membrane-electrode assembly was obtained.

(Production of Cell for Fuel Cell)

A cell for fuel cell was produced using commercially available JARI standard cell. More specifically, a carbon cross as a gas diffusion layer and a carbon separator to which a groove for gas passage was formed by cutting were disposed in this order on both sides of the above mentioned membrane-electrode assembly. Further the collector and an end-plate were disposed in this order on the outside thereof, followed by bolting them up, then the cell for fuel cell with 25 $cm^2$ of effective membrane area was set up.

(Fuel Cell Operating Test)

While keeping the temperature of obtained cell for the fuel cell at 80° C., hydrogen in low humidified state (70 mL/minute, back pressure 0.1 MPaG) and air (174 mL/minute, back pressure 0.05 MPaG) were introduced into the cell, and a load change test was carried out under opening circuit and constant current conditions. In the cell for fuel cell provided with the polymer electrolyte membrane A, 3,000 hours operation was demonstrated without causing gas leak despite a test for accelerating deterioration which repeated a state of opening circuit and constant current, and it also showed sufficient durability.

Comparative Example 1

<Production of Electrolyte Membrane>

The polymer electrolyte B obtained in the above Synthesis example 2 was dissolved in NMP to prepare a solution with a concentration of 13.5 weight % of the polymer electrolyte B. Further, the polymer compound P obtained by Synthesis example 3 was added in the solution so that a ratio of polymer compound P to the polymer electrolyte B is 11 weight % and dissolved, thus coating solution was prepared. Obtained coating solution was coated on PET film by die casting method. The membrane obtained by drying the solvent was further subjected to acid treatment with 2N hydrochloric acid and washed with water followed by drying. Thereby, the polymer electrolyte membrane B with the thickness of 30 μm was obtained.

<Measurement of Amount of Maximum Elastic Deformation of Electrolyte Membrane>

A polymer electrolyte membrane B which was cut into 13 cm×5 cm size was prepared.

Obtained polymer electrolyte membrane B was dried in the same manner as the electrolyte membrane A and the tensile test was carried out.

The amount of maximum elastic deformation of the polymer electrolyte membrane B obtained in the dry state before the Fenton test was 8%.

<Dimension Measurement of Plane Direction in Dry State before Fenton Test>

A polymer electrolyte membrane B which was cut into 5 cm×5 cm size was left in the furnace under vacuum drying condition at 60° C. (5% RH or less) for 24 hours and dried, and dimensions in each direction of the plane direction were immediately measured.

<Dimension Measurement of Plane Direction in Dry State and Wet State after Fenton Test>

The Fenton test was carried out for a polymer electrolyte membrane B which was cut into 5 cm×5 cm size in the same manner as the polymer electrolyte membrane A. After the Fenton test, the polymer electrolyte membrane B was washed with 1N hydrochloric acid, and further washed with ultra pure water followed by vacuum drying at 60° C. for 24 hours. Subsequently, alternating boiling for 1 hour in a hot water at 80° C. ("in water at 80° C.") and vacuum drying for 24 hours at 60° C. ("V.D.") was repeated for 5 times so that the wet state and the dry state were alternated for 5 times. A percentage of dimensional change in each wet state and dry state [based on dimension in plane direction obtained in the dry state before the Fenton test (*1 in FIG. 5)] is shown in FIG. 5 ("after Fenton test" in FIG. 5).

Figure 5:
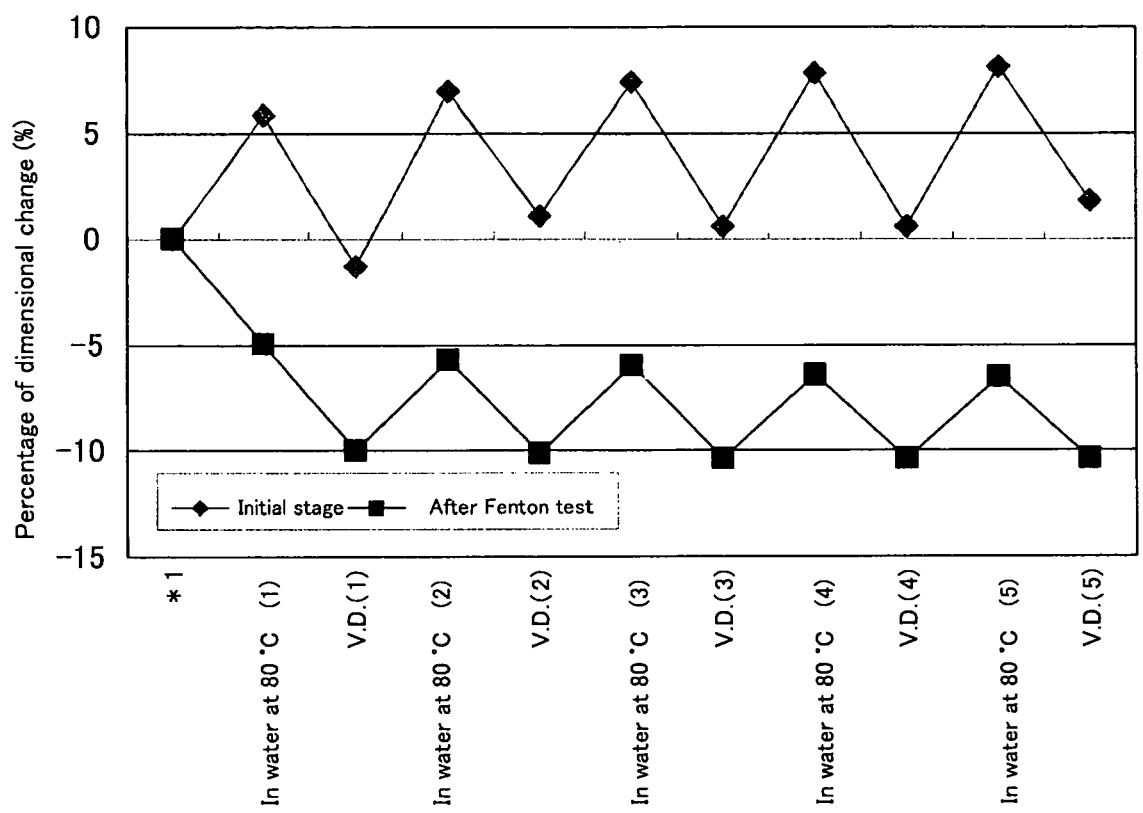
FIG. 5 is a diagram illustrating a percentage of dimensional change (initial·after Fenton test) of an electrolyte membrane B in Examples.

As shown in FIG. 5, the amount of dimensional change of the polymer electrolyte membrane B in the plane direction obtained in the dry state before and after the Fenton test was 10%, it was larger than the amount of maximum elastic deformation (8%) obtained in the dry state before the Fenton test.

On the other hand, in the deteriorated state after the Fenton test, the percentage of dimensional change in the plane direction which was caused when transferring between the dry state and the wet state is about 4 to 5%, it was smaller than the amount of maximum elastic deformation (8%) obtained in the dry state before the Fenton test.

In FIG. 5, for the polymer electrolyte membrane B before the Fenton test, a percentage of dimensional change in each wet state and dry state when alternating boiling for 1 hour in a hot water at 80° C. ("in water at 80° C.") and vacuum drying for 24 hours at 60° C. ("V.D.") was repeated for 5 times so that the wet state and the dry state were alternated for 5 times, is shown together ("initial stage" in FIG. 5). FIG. 5 shows that polymer electrolyte membrane B in un-deteriorated state before the Fenton test greatly swelled in the wet state compare to the one in the dry state as the polymer electrolyte membrane A. On the other hand, the polymer electrolyte membrane B after the Fenton test contracted even in the wet state compared to dry state (contracted state) before the Fenton test (un-deteriorated). This means the polymer electrolyte membrane B greatly contracted by the chemical deterioration.

From FIG. 2 and FIG. 5, a dimensional change of the polymer electrolyte membrane B before and after the Fenton test was large compared to the polymer electrolyte membrane A, and the contraction percentage after the Fenton test was also large, which showed that the polymer electrolyte membrane B easily caused chemical deterioration.

<Evaluation of Strength of Electrolyte Membrane>

Figure 3:
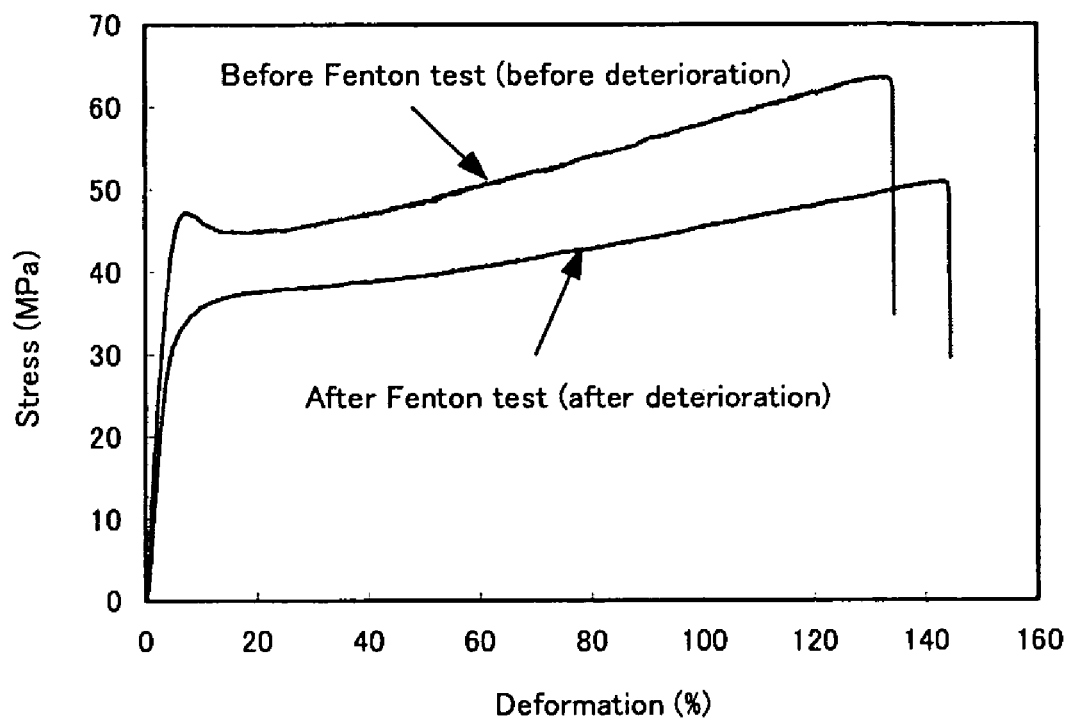
FIG. 3 is a diagram illustrating results of tension test of an electrolyte membrane A in Examples.

After carrying out the Fenton test for the polymer electrolyte membrane A and the polymer electrolyte membrane B in the above mentioned manner, the membranes A and B were respectively vacuum dried at 60° C. for 24 hours and brought into dry state, then the tensile test was immediately carried out in the same manner as the above measurement of the amount of maximum elastic deformation of the polymer electrolyte membrane. Results are shown in FIG. 3 (polymer electrolyte membrane A) and FIG. 4 (polymer electrolyte membrane B).

Figure 4:
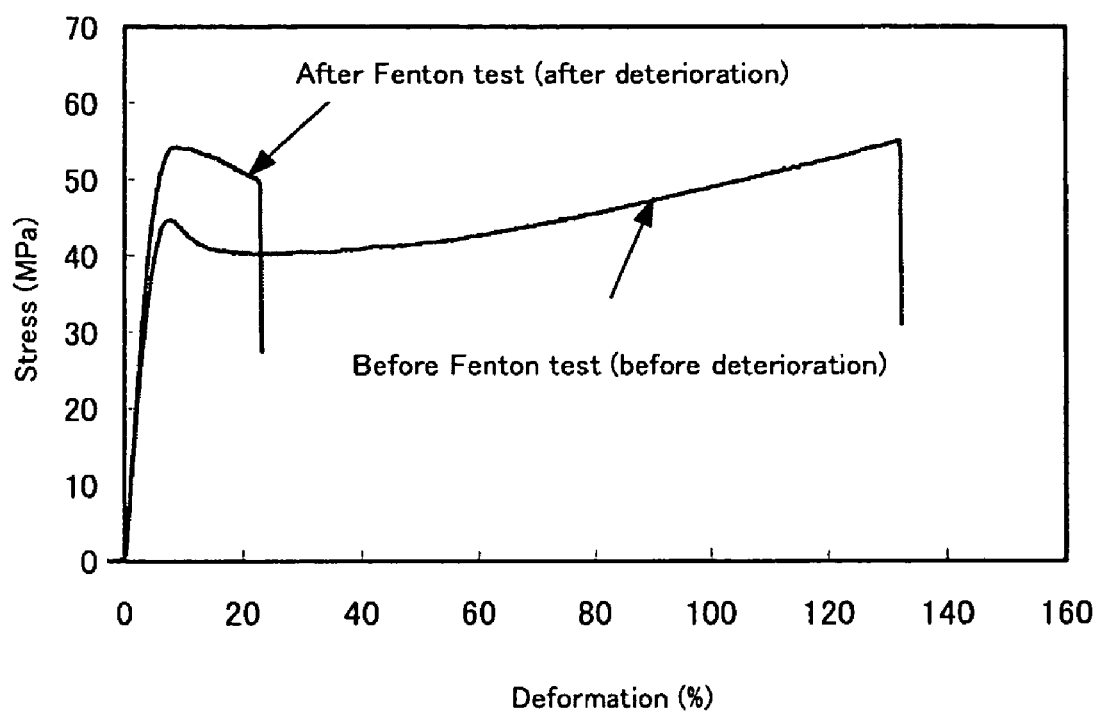
FIG. 4 is a diagram illustrating results of tension test of an electrolyte membrane B in Examples.

FIG. 4 shows that the polymer electrolyte membrane B of Comparative example having larger percentage of the dimensional change before and after the Fenton test than the amount of maximum elastic deformation caused extreme chemical deterioration and fractured without showing plastic deformation. This means that the strength was significantly declined. By contrast, as shown in FIG. 3, the polymer electrolyte membrane A of the present invention, having smaller percentage of the dimensional change before and after the Fenton test than the amount of maximum elastic deformation, had a high radical resistance and low decline of strength, so that the membrane A could keep the strength after causing chemical deterioration.

The above results shows that the electrolyte membrane of the present invention which retains durability even after having undergone a dimensional change accompanying chemical deterioration caused owing to radical having high oxidative ability such as hydroxyl radicals (.OH) and peroxide radical (.OOH). Therefore, by using the electrolyte membrane of the present invention, it is possible to obtain the fuel cell having excellent durability. In addition, by using the selecting method of the present invention, it is possible to select easily the electrolyte membrane which is suitable for use in the fuel cell having the above-mentioned high durability.

What is claimed is:

1. An electrolyte membrane having an amount of dimensional change in a plane direction of the electrolyte membrane between dimensions obtained in a dry state before and after carrying out a Fenton test, the amount of dimensional change before and after the Fenton test being smaller than an amount of maximum elastic deformation in a plane direction of the electrolyte membrane obtained in a dry state before carrying out the Fenton test, provided that the Fenton test is carried out under the following condition:

<Condition of Fenton test>

(1) iron ion ($Fe^{2+}$) concentration: 4 ppm
(2) hydrogen peroxide concentration: 3 wt %
(3) boiling temperature: 80° C.
(4) boiling time: 120 minutes.

2. An electrolyte membrane according to claim 1, wherein the electrolyte membrane has an amount of dimensional change in a plane direction obtained by transferring the electrolyte membrane after carrying out the Fenton test between the dry state and a wet state, the amount of dimensional change between the dry state and the wet state being smaller than an amount of maximum elastic deformation in a plane direction obtained in the dry state before carrying out the Fenton test.

3. An electrolyte membrane according to claim 1, wherein the amount of maximum elastic deformation in a plane direction obtained in the dry state before carrying out the Fenton test is 7% or more.

4. An electrolyte membrane according to claim 1, wherein the electrolyte membrane comprises a hydrocarbon polymer electrolyte resin.

5. A method of selecting an electrolyte membrane comprising steps of:

measuring an amount of maximum elastic deformation in a plane direction of the electrolyte membrane obtained in a dry state before carrying out the Fenton test in the condition described in claim 1;

carrying out the Fenton test for the electrolyte membrane; and, measuring an amount of dimensional change in a plane direction of the electrolyte membrane between dimensions obtained in the dry state before and after carrying out the Fenton test;

wherein the electrolyte membrane is determined as a good product provided that the amount of dimensional change in a plane direction of the electrolyte membrane between dimensions obtained in the dry state before and after carrying out the Fenton test is smaller than the amount of maximum elastic deformation in a plane direction obtained in the dry state before carrying out the Fenton test.

* * * * *